Patented Mar. 25, 1941

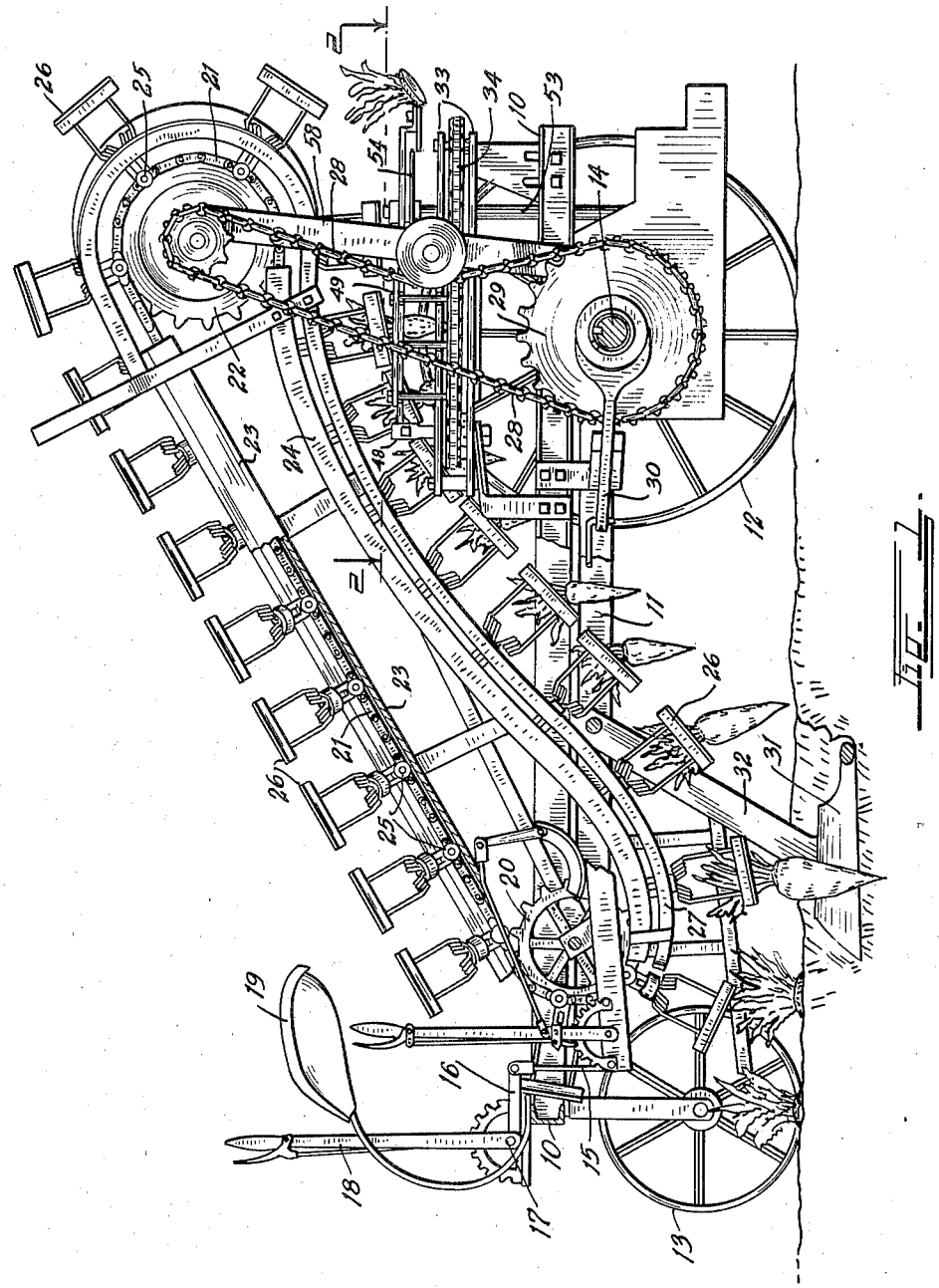

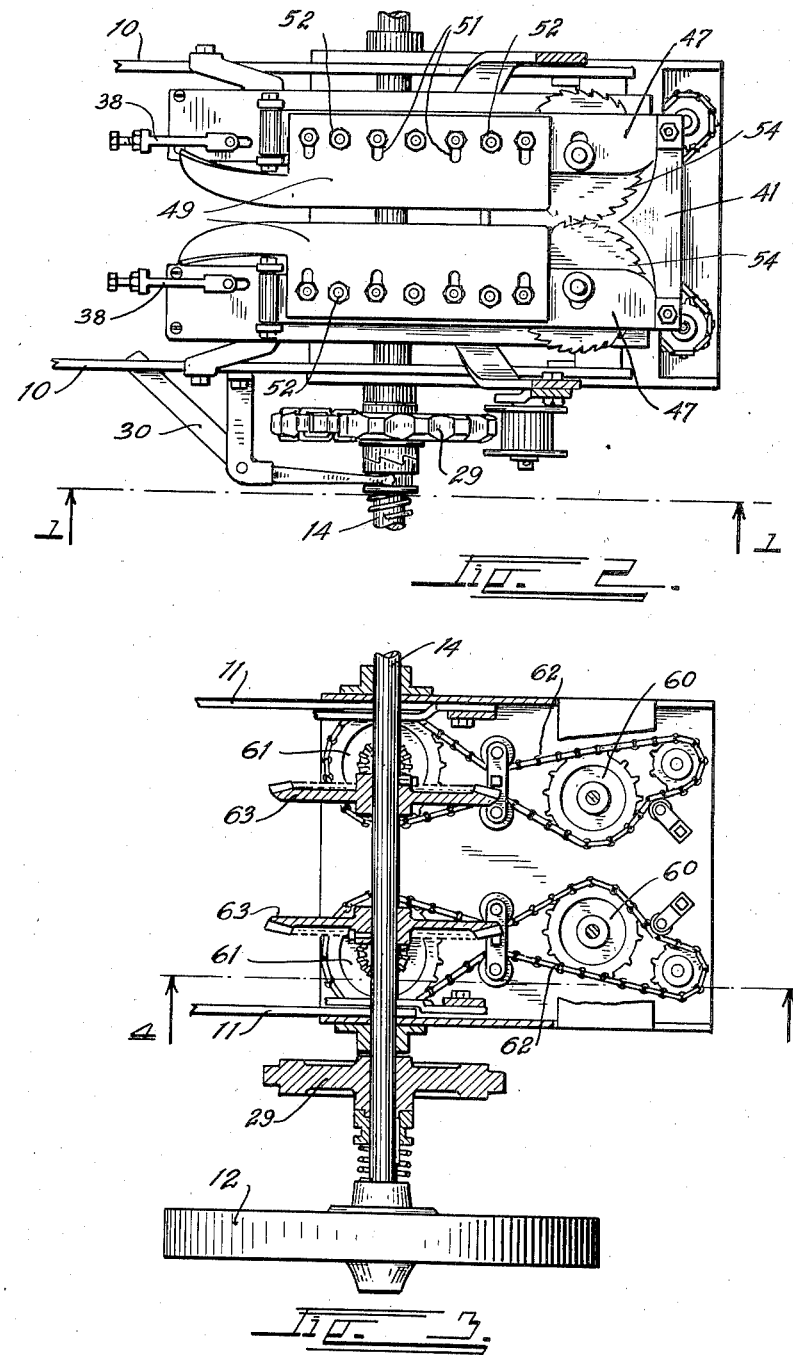

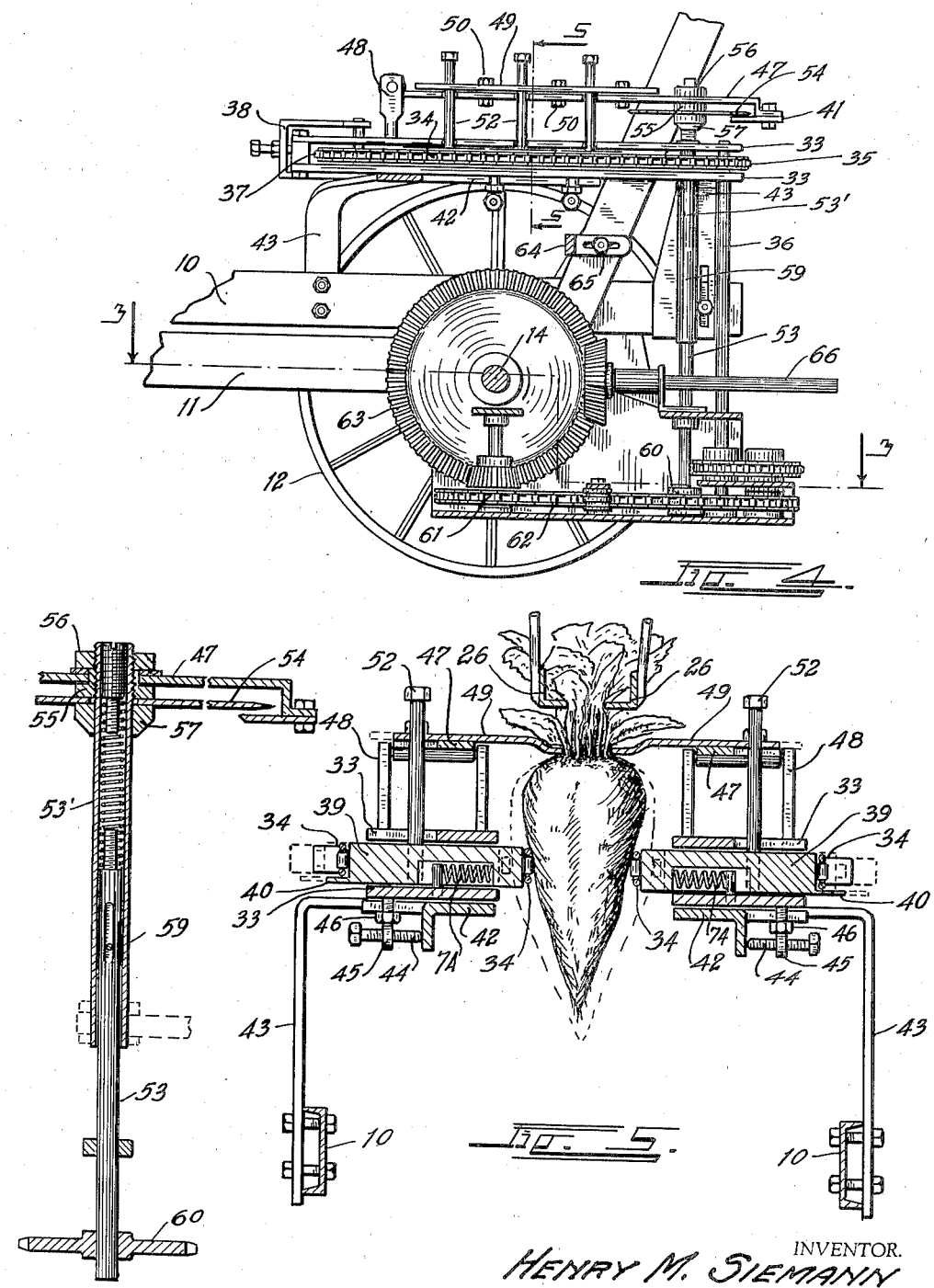

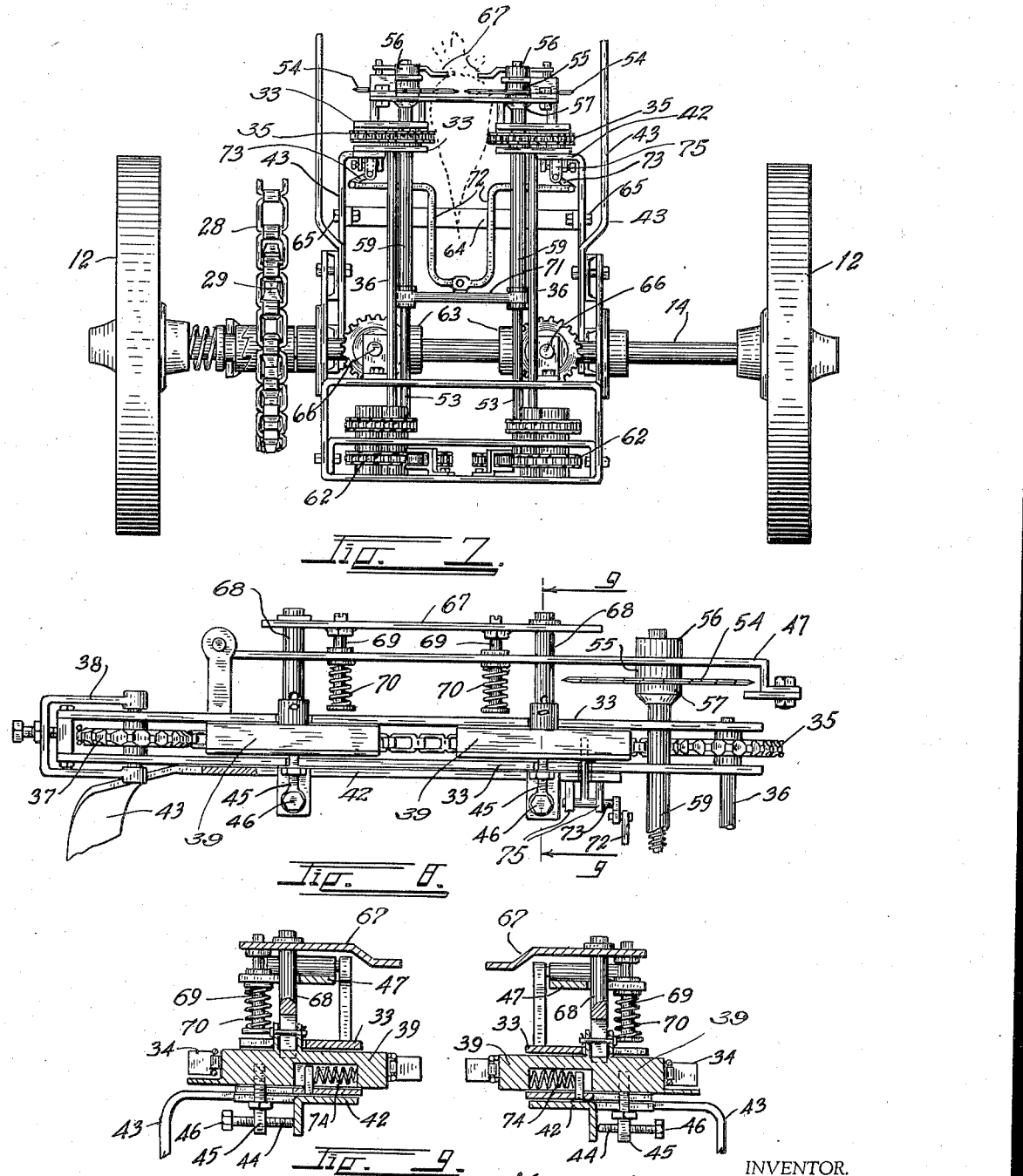

2,236,075

UNITED STATES PATENT OFFICE 2,236,075

HARVESTER FOR PLANTS OF THE BEET TYPE

Henry M. Siemann, Fort Lupton, Colo., assignor of forty-nine per cent to Eugene De Muth, Fort Lupton, Colo.

Application July 31, 1939, Serial No. 287,535

10 Claims. (Cl. 146—85)

This invention relates to a harvesting machine for harvesting plants of the beet type and is more particularly designed as an improvement over the harvester illustrated and described in applicant's prior Patent 1,914,621.

The principal object of this invention is to provide a highly efficient harvester which will dig and lift the plants, such as sugar beets, pick up the dug plants, carry them to a topping device and automatically align them with cutting knives so that the latter will cut the crown or top therefrom at a depth proportional to the size of the beet.

Other objects of the invention are to provide a topping device for a sugar beet digger of the type illustrated in applicant's prior patent which will sever the crowns or tops on a rounded cut line so as to preserve a maximum amount of beet content.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a longitudinal vertical section through the complete harvester.

Fig. 2 is a detail plan view of the topping portion of the device, taken on the line 2—2, Fig. 1.

Fig. 3 is a detail horizontal section, taken on the line 3—3, Fig. 4.

Fig. 4 is a detail vertical section through the rear axle illustrating the drive mechanism for the topping device.

Fig. 5 is an enlarged section, taken on the line 5—5, Fig. 4, illustrating the beet aligning plates.

Fig. 6 is a detail section through one of the knife shafts.

Fig. 7 is a fragmentary rear view of the machine illustrating the driving mechanism.

Fig. 8 is a fragmentary side view illustrating an alternate method of mounting the beet gauge plates.

Fig. 9 is a cross sectional view taken on the line 9—9, Fig. 8.

The digging and elevating portion of the elevator is fully illustrated and described in applicant's said prior patent and will be but briefly outlined herein. This application relates more particularly to a topping device on a harvester of this character.

The harvester is supported on a fixed frame 10 within which a floating frame 11 is suspended. The frame 10 is supported at its rearward extremity upon ground engaging wheels 12 which are connected across the machine by means of a rotatable axle shaft 14. The front of the frame 10 is supported on guide wheels 13 and it may be provided with an operator's seat 19 and any suitable draw bar attachment by means of which it may be towed by a team or tractor.

The frame 11 is hingedly mounted at its rear on the axle shaft 14 and is suspended at its forward extremity by means of suspension links 15 from levers 16 extending from a depth adjusting shaft 17. The position of the shaft 17 can be regulated by means of a depth adjusting lever 18.

Idler chain sprockets 20 are journalled at the front of the frame 11 from which a conveyor chain 21 is trained rearwardly over a drive sprocket 22 supported above the rearward extremity of the frame 11. The upper reach of the chain 21 is guided by the means of a straight guide channel 23 and the lower reach of the guide chain is guided by means of a curved guide channel 24. The chain is provided with outwardly extending rollers 25 which travel in the channels to cause the chain to travel in the proper curved path.

A series of spring expanded top clamps 26 project outwardly from the links of the chain 21. Normally, these clamps are held open by their own spring action. As they approach a position over the beet being dug, however, they are forced closed by striking a curved closing bar 27 so as to clamp the beet top and elevate the beet as shown in Fig. 1. The closing bars 27 separate from each other about the sprocket 22 to allow the clamps 26 to open to release the tops.

The upper drive sprocket 22 is driven through the medium of a transmission chain 28 from a drive sprocket 29 on the rear axle 14 by means of a clutch operated by a shifting lever 30. The beets are dug and lifted by means of a pair of lifting plows 31 carried on the lower forward extremities of plow beams 32 extending downwardly from the frame 11.

As thus far described, the harvester is substantially similar to the harvester illustrated in applicant's prior patent. In the present harvester, however, two horizontal pairs of frame plates 42 are fixedly supported below the rear portion of the conveyor chain 21 upon bracket arms 43. A pair of chain plates 33 rests upon each frame plate. Between each pair of chain plates 33 is an endless gripping chain 34. At the rearward extremities of the chain plates 33, the chains 34 pass about drive sprockets 35 secured on the upper extremity of vertical chain shafts 36. At their forward extremities, the chains 34 pass about idler sprockets 37 which can be shifted by means of tension yokes 38 to adjust the tension in the chains.

A series of floating blocks 39 are slidably positioned between each pair of plates 33 and act to separate the two reaches of each of the chains 34 and hold them in straight alignment. The chains travel on the inner and outer faces of these blocks. On the outer faces, the chains are supported upon flanges 40 projecting from the blocks 39. The plates 33 are pivoted at their rearward extremities on the chain shafts 36 and are free to swing toward and away from each other at their forward extremities. The amount of inward movement can be preset by means of set screws 44 which contact the frame plates 42. The set screws are mounted in eye bolts 45 provided with nuts 46 which act to hold the chain plates 33 down upon the frame plates 42. The bolts 45 travel in slots in the plates 42, however, so that the chain plates can swing horizontally.

A knife plate 47 is hinged on a hinge bracket 48 adjacent the forward portion of each pair of chain plates 33. The rearward extremities of the knife plate 47 are hingedly connected together by means of a knife blade 41. A gauge plate 49 is slidably secured on each of the knife plates 47 by means of hold down bolts 50 which extend through slotted openings 51 in the gauge plates 49. The gauge plates are moved inwardly and outwardly independently of the chain plates by means of headed rods 52 which extend downwardly through slotted openings in the knife plates 47 and through the upper chain plates 33 into the floating blocks 39. Thus, as the blocks 39 move outwardly, they draw the gauge plates 49 also outwardly to separate the latter.

A telescoping knife shaft consisting of a tubular portion 53' and a solid portion 53 extends upwardly through a slotted opening in each of the chain plates 33 and through the knife plates 47. Each of these shafts carries a disc knife 54, preferably having a serrated edge as illustrated. The knives 54 are secured to the tubular portions 53' of the shafts against a set collar 57 by means of a clamp nut 55 which extends through one of the knife plates 47 in which it is held by means of a restraining nut 56. This construction causes the knives 54 and the tubular portions 53' of the shafts to be lifted and lowered by the knife plates 47 without raising and lowering of the rearward extremity of the chain plates 33.

The lower extremities of the knife shafts 53 are keyed into knife sprockets 60 which are driven from drive sprockets 61 through the medium of a pair of drive chains 62. The sprockets 61 are driven from the rear axle 14 through bevel gears 63.

It will be noted that the rearward extremities of the guide channels 24 are inclined upwardly over the gauge plates 49 and, as the chain continues to travel upward, the beets are pulled tightly against the bottom of the gauge plates 49. The chains 34 now grip the opposite sides of the beets and carry them rearwardly toward the knives 54.

The larger beets spread the blocks 39 and in doing so spread the gauge plates 49 so as to allow the crown or top thereof to pass further upward between the plates and further upward above the knives. Thus a deeper top is cut from the larger beets than from the smaller, resulting in a saving in beet pulp on the smaller beets.

A striker bar 64 extends against the frame below the chains 34. The root tip of the beets strikes this bar at approximately the same time the crown strikes the knives. This prevents the pressure of the knife from swinging the top of the beet rearward and also acts to swing the beet top in an arc so that a round top will be cut therefrom. The position of the striker bar 64 can be varied by adjusting clamping nuts 65.

The topped beets can be gathered in any suitable conveyor, not shown, and the tops can be similarly carried off. A conveyor drive shaft 66 extends rearwardly from one of the bevel gears 63 on the rear axle for driving any desired conveyors.

It will be noted that the entire assembly of plates 47 and 49, the knives 54 and the upper portions of the knife shafts are hingedly mounted on the brackets 48 so that they can be lifted upwardly as a unit should the upward pull of the grippers on the beet tops be excessive so as to prevent the beets from being pulled away from their tops. This upward movement however, does not affect the depth of the cut since the relative position of the knives remains the same.

In Figs. 8 and 9 an additional automatic adjustment for compensating for the variations in beet sizes is shown. This adjustment is accomplished by mounting gauge plates 67 above the knife plates 47 upon posts 68 which extend downwardly into receiving sockets in the floating blocks 39. Spring studs 69 extend downwardly from the gauge plates through the knife plates and carry compression springs 70 acting against heads on the spring studs to resiliently support the knife plates 47 and the disc knives 54.

A cross head 71 extends between the tubular portions of the knife shafts. This cross head is suspended by means of a pair of links 72 from a pair of bell crank levers 73, there being one bell crank lever beneath each of the rear floating blocks 39. The levers 73 are pivotally mounted in bearing hangers 75 which are secured to and extend downwardly from the frame plates 42. An arm of each bell crank lever projects upward into the block 39 above it. Thus, as the blocks 39 move outwardly, the levers act through the links 72 to depress the knives.

Let us assume that an unusually large beet enters between the gripping chains 34. It pushes the opposite floating blocks apart and causes the posts 68 to pull the gauge plates apart thus allowing the crown of the beet to enter therebetween. The blocks in separating cause the links 72 to push the two knives downward so as to cut a deeper cut from the large beet. The knives in moving downward pull the knife plates 47 downward with them. They do not however pull the gauge plates down as these are resting on the beet crown and as a result the springs 70 absorb the downward movement. Thus, the knives move up and down in relation to the gauge plates in consequence of variations in the diameter of the beets.

In each of the floating blocks 39 a compression spring 74 is mounted. These springs act to force the blocks against the adjacent reaches of the conveyor chains so as to firmly clamp the beets therebetween.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A topping mechanism for beet harvesters of the type in which the beets are elevated by means of their foliage comprising: a knife plate at each side of the line of travel of said beets; means for hingedly supporting said knife plates at their forward extremities so that they will lie in a substantially horizontal plane; a rotating knife disc supported by each knife plate adjacent its rearward extremity; a stationary knife blade connecting said rearward extremities at the rear of said rotating knives; and gauge plates projecting inward from said knife plates so as to overlie the crowns of said beets and align them with said knives.

2. A topping mechanism for beet harvesters of the type in which the beets are elevated by means of their foliage comprising: a knife plate at each side of the line of travel of said beets; means for hingedly supporting said knife plates at their forward extremities so that they will lie in a substantially horizontal plane; a rotating knife disc supported by each knife plate adjacent its rearward extremity; a stationary knife blade connecting said rearward extremities at the rear of said rotating knives; gauge plates projecting inward from said knife plates so as to overlie the crowns of said beets and align them with said knives; and means for automatically separating said gauge plates in accordance with the sizes of said beets.

3. A topping mechanism for beet harvesters of the type in which the beets are elevated by means of their foliage comprising: a knife plate at each side of the line of travel of said beets; means for hingedly supporting said knife plates at their forward extremities so that they will lie in a substantially horizontal plane; a rotating knife disc supported by each knife plate adjacent its rearward extremity; a stationary knife blade connecting said rearward extremities at the rear of said rotating knives; gauge plates projecting inward from said knife plates so as to overlie the crowns of said beets and align them with said knives; and an endless conveyor below each knife plate, the adjacent reaches of said conveyors contacting opposite sides of said beets to carry the latter toward said knives.

4. A topping mechanism for beet harvesters of the type in which the beets are elevated by means of their foliage comprising: a knife plate at each side of the line of travel of said beets; means for hingedly supporting said knife plates at their forward extremities so that they will lie in a substantially horizontal plane; a rotating knife disc supported by each knife plate adjacent its rearward extremity; a stationary knife blade connecting said rearward extremities at the rear of said rotating knives; gauge plates projecting inward from said knife plates so as to overlie the crowns of said beets and align them with said knives; an endless conveyor below each knife plate, the adjacent reaches of said conveyors contacting opposite sides of said beets to carry the latter toward said knives; and means for causing said gauge plates to separate from each other in accordance with the separation of the adjacent reaches of said conveyors.

5. A topping mechanism for beet harvesters of the type in which the beets are elevated by means of their foliage comprising: a knife plate at each side of the line of travel of said beets; means for hingedly supporting said knife plates at their forward extremities so that they will lie in a substantially horizontal plane; a rotating knife disc supported by each knife plate adjacent its rearward extremity; a stationary knife blade connecting said rearward extremities at the rear of said rotating knives; gauge plates projecting inward from said knife plates so as to overlie the crowns of said beets and align them with said knives; an endless conveyor below each knife plate, the adjacent reaches of said conveyors contacting opposite sides of said beets to carry the latter toward said knives; slide blocks in each conveyor member; spring means for forcing said blocks against the rear of the adjacent reaches to cause the latter to grip and carry the beets to said knives.

6. A topping mechanism for beet harvesters of the type in which the beets are elevated by means of their foliage comprising: a knife plate at each side of the line of travel of said beets; means for hingedly supporting said knife plates at their forward extremities so that they will lie in a substantially horizontal plane; a rotating knife disc supported by each knife plate adjacent its rearward extremity; a stationary knife blade connecting said rearward extremities at the rear of said rotating knives; gauge plates projecting inward from said knife plates so as to overlie the crowns of said beets and align them with said knives; an endless conveyor below each knife plate, the adjacent reaches of said conveyors contacting opposite sides of said beets to carry the latter toward said knives; slide block in each conveyor member; spring means for forcing said blocks against the rear of the adjacent reaches to cause the latter to grip and carry the beets to said knives; and means connecting said slide blocks with said gauge plates to cause the latter to separate when said reaches separate.

7. A topping mechanism for beet harvesters of the type in which the beets are elevated by means of their foliage comprising: a knife plate at each side of the line of travel of said beets; means for hingedly supporting said knife plates at their forward extremities so that they will lie in a substantially horizontal plane; a rotating knife disc supported by each knife plate adjacent its rearward extremity; a stationary knife blade connecting said rearward extremities at the rear of said rotating knives; gauge plates projecting inward from said knife plates so as to overlie the crowns of said beets and align them with said knives; and means for drawing said knife plates downward from said gauge plates a distance proportional to the size of said beets to cause said knives to take a deeper crown from the larger beets.

8. A topping mechanism for beet harvesters of the type in which the beets are elevated by means of their foliage comprising: a knife plate at each side of the line of travel of said beets; means for hingedly supporting said knife plates at their forward extremities so that they will lie in a substantially horizontal plane; a rotating knife disc supported by each knife plate adjacent its rearward extremity; a stationary knife blade connecting said rearward extremities at the rear of said rotating knives; a gauge plate supported in a fixed horizontal position above each knife plate for contacting the crowns of the beets to align them for said knives; an endless conveyor member at each side of the line of travel of said beets below said knife plates for gripping the beets therebetween and carrying them toward said knives; resiliently mounted members forcing said conveyor members against said beets; and means for drawing said knife plates and said knives downward from said gauge plates as said conveyor members are forced apart by said beets.

9. A topping mechanism for beet harvesters of the type in which the beets are elevated by means of their foliage comprising: a knife plate at each side of the line of travel of said beets; means for hingedly supporting said knife plates at their forward extremities so that they will lie in a substantially horizontal plane; a rotating knife disc supported by each knife plate adjacent its rearward extremity; a stationary knife blade connecting said rearward extremities at the rear of said rotating knives; a gauge plate supported in a fixed horizontal position above each knife plate for contacting the crowns of the beets to align them for said knives; an endless conveyor member at each side of the line of travel of said beets below said knife plates for gripping the beets therebetween and carrying them toward said knives; slide blocks in each conveyor; spring means for forcing said slide blocks against the adjacent reaches of said conveyor means to cause the latter to grip the beets; levers connected with said slide blocks so as to be swung by the beet-induced movements of said blocks; and means for communicating the movements of said levers to said knife plates so as to swing said knives downward from said gauge plates as the size of the beets increases.

10. A topping mechanism for beet harvesters of the type in which the beets are elevated by means of their foliage comprising: a substantially horizontal gauge plate at each side of the line of travel of the elevating beets against which the crowns thereof are pulled; a pair of rotating knives positioned below the rearward extremities of said gauge plates; an endless conveyor member at each side of the line of travel of said beets below said gauge plates; means for resiliently forcing the conveyor members toward each other to grip the beets therebetween and convey them rearwardly toward said knives; and stationary means against which the lower tips of the beets contact to swing the crowns in an arc as they are conveyed against said knives.

HENRY M. SIEMANN.